US008011232B2

(12) United States Patent
Protin et al.

(10) Patent No.: US 8,011,232 B2
(45) Date of Patent: Sep. 6, 2011

(54) METHOD FOR DIAGNOSING THE CONDITION OF AN ENGINE FUEL SUPPLY SYSTEM

(75) Inventors: Nicolas Protin, Versailles (FR); Michel Leporcq, Morsang sur Orge (FR)

(73) Assignee: Renault S.A.S., Boulogne Billancourt (FR)

( * ) Notice: Subject to any disclaimer, the term of this patent is extended or adjusted under 35 U.S.C. 154(b) by 0 days.

(21) Appl. No.: 12/743,111

(22) PCT Filed: Nov. 5, 2008

(86) PCT No.: PCT/FR2008/051990

§ 371 (c)(1), (2), (4) Date: Sep. 1, 2010

(87) PCT Pub. No.: WO2009/068777

PCT Pub. Date: Jun. 4, 2009

(65) Prior Publication Data

US 2010/0313641 A1 Dec. 16, 2010

(30) Foreign Application Priority Data

Nov. 20, 2007 (FR) ..................................... 07 08131

(51) Int. Cl.
*G01M 15/10* (2006.01)

(52) U.S. Cl. ................ 73/114.49; 73/114.38; 73/114.45

(58) Field of Classification Search ............... 73/114.38, 73/114.45, 114.49

See application file for complete search history.

(56) References Cited

U.S. PATENT DOCUMENTS

| | | | | |
|---|---|---|---|---|
| 4,287,865 | A | 9/1981 | Seitz | |
| 5,579,747 | A * | 12/1996 | Sato et al. | 123/690 |
| 5,623,913 | A * | 4/1997 | Kitajima et al. | 123/673 |
| 5,706,793 | A | 1/1998 | Orzel et al. | |
| 6,067,965 | A * | 5/2000 | Trumpy et al. | 123/480 |
| 6,568,246 | B1 | 5/2003 | Ponagai et al. | |
| 7,562,561 | B2 * | 7/2009 | Murakami | 73/49.7 |
| 2011/0030665 | A1 * | 2/2011 | Protin et al. | 123/704 |

OTHER PUBLICATIONS

U.S. Appl. No. 12/743,277, filed May 17, 2010, Protin, et al.

* cited by examiner

*Primary Examiner* — Freddie Kirkland, III

(74) *Attorney, Agent, or Firm* — Oblon, Spivak, McClelland, Maier & Neustadt, L.L.P.

(57) ABSTRACT

A method for diagnosing a condition of a system for supplying fuel to a fuel injected controlled-ignition internal combustion engine, of a type including an electric control device that makes use of an oxygen probe for closed-loop regulation of a value of air/fuel ratio admitted to combustion chambers of the engine, and according to which a signal delivered by an oxygen probe is analyzed, the method a) deducing from the signal, a change in a effective injection time making it possible to regulate richness of exhaust gases leaving the engine; b) calculating CRITERION=ƒ(CRITERION 1+CRITERION2+CRITERION3); c) comparing CRITERION against predetermined minimum and maximum threshold values THRESHOLD_MIN and THRESHOLD_MAX; d) diagnosing a defective condition when CRITERION is outside of a window included between THRESHOLD_MIN and THRESHOLD_MAX.

7 Claims, 5 Drawing Sheets

ALPHACL average
Appearance of defect
$t_1$
AD
Nominal value

Time (s)
Approximately a few minutes
Instantaneous GAIN
Nominal value

Time (s)
Instantaneous OFFSET
Nominal value

Time (s)
CRITERION
Maximum detection threshold
CRITERION 2 and CRITERION 3
0
CRITERION 1
CRITERION Minimum detection threshold
Time (s)
Detection of defect
DF

METHOD FOR DIAGNOSING THE CONDITION OF AN ENGINE FUEL SUPPLY SYSTEM

The present invention relates to a method for diagnosing the state of a system for supplying fuel to a fuel-injected, controlled-ignition internal combustion engine, of the type comprising an electronic control device which makes use of an oxygen probe for closed-loop regulation of the value of the air-fuel ratio admitted into the combustion chambers of said engine.

Current regulations, in terms of pollutant emissions, demand "the monitoring of the fuel supply system in relation to its capacity to meet the emissions standards". A failure of this system leading to a violation of the "OBD thresholds" (OBD standing for On Board Diagnostic) must be signaled to the driver of the vehicle by the lighting of an "OBD" lamp.

Defects in a fuel supply system, such as fuel leaks, obstructions or ageing, lead to a variation of the hydraulic characteristics within said system, which consequently impairs the quality of the regulation of the fuel richness of the injected fuel/air mixture.

Thus, the richness leaving the engine is no longer contained within the effectiveness window of the catalytic converter at certain operating points of the engine, then leading to a drop in the effectiveness of said engine, and an increase in the quantity of pollutants emitted from the vehicle's exhaust gas manifold.

Observing the requirement detailed above amounts to finding means for directly or indirectly monitoring the quantity of fuel injected.

In the patent U.S. Pat. No. 5,706,793, this problem is resolved as follows:

The injection time Tinj is calculated as follows:

$$Tinj=MAIR*GAIN*ALPHACL/14.65$$

with:

- MAIR: mass of air admitted into the cylinder,
- GAIN: coefficient that makes it possible to learn the drift of the hydraulic characteristics of the fuel supply system,
- ALPHACL: injection time correction factor making it possible to regulate the richness of the exhaust gases leaving the engine as a function of the output voltage of the lambda probe.

When GAIN leaves a window delimited by two thresholds, then the defect is declared.

When GAIN remains contained within this window, then the strategy monitors whether ALPHACL departs from another window delimited by two other thresholds. In practice, when ALPHACL remains within the window, then no defect is detected, whereas if its departs from said window, the defect is detected.

This diagnosis therefore monitors, almost independently, ALPHACL and GAIN, when they are linked via the calculation of the injection time and its effect on the richness of the exhaust gases upstream of the catalytic converter.

This can have damaging consequences, for example in the case of ageing of the fuel supply system.

Thus, GAIN could depart from its monitoring window to compensate for the drifts in the hydraulic characteristics of the system, whereas ALPHACL would remain close to its nominal value. In this case, the OBD thresholds will not be exceeded, whereas the system could be considered to be defective. This would therefore be a case of false detection.

Furthermore, the analysis of the reliability of the diagnosis is made difficult since it is impossible to have a reliability criterion that is identical to the diagnosis criterion.

The present invention aims to resolve these problems, by proposing a method for diagnosing the state of a system for supplying fuel to a fuel-injected, controlled-ignition internal combustion engine, which makes it possible to detect defects by taking into account the interactions between the different parameters used to determine the change in the effective injection time, and do so rapidly, and without having to make use of additional specific means.

It also aims to supply a diagnosis method for which the criterion can also serve as a reliability criterion so that the reliability analysis is as representative as possible of the static behavior of the diagnosis.

Thus, the invention relates to a method for diagnosing the state of a system for supplying fuel to a fuel-injected, controlled-ignition internal combustion engine, of the type comprising an electronic control device which makes use of an oxygen probe for closed-loop regulation of the value of the air-fuel ratio admitted into the combustion chambers of said engine, and according to which the signal delivered by said oxygen probe is analyzed, characterized in that it consists in:

a) deducing from said signal, the change in the effective injection time of the exhaust gas leaving the engine, given by the relation:

$$\text{effective injection time}=B+\text{ALPHACL\_MOYEN}*\text{GAIN}*A*\text{Mair},$$

in which:

B is an OFFSET value;

ALPHACL_MOYEN is an injection time correction factor that makes it possible to regulate the richness of the exhaust gases leaving the engine;

GAIN is a coefficient making it possible to take account of the drift in the hydraulic characteristics of the fuel supply system;

A is a factor that takes into account various phenomena notably linked to canister draining, the wetting of the walls;

Mair is the measured or estimated mass of air admitted into a cylinder of the engine;

b) calculating $$\text{CRITERION}=f(\text{CRITERION1}+\text{CRITERION2}+\text{CRITERION3})$$

in which

CRITERION1=difference between the value of ALPHACL_MOYEN for which no correction to the injection time as a function of time is necessary to achieve the richness objective 1 in the exhaust, and the value ALPHACL_MOYEN applied to the injection time, to achieve the richness objective 1 at the exhaust, CRITERION2=difference between the instantaneous OFFSET value corresponding to the use of a "theoretical" fuel supply system, that is to say such a system that is not dispersed and not aged and whose average characteristic coincides with the value for which no modification of the injection time is applied, and the instantaneous OFFSET value applied to the injection time, for a given vehicle (specific to each vehicle produced), CRITERION3=difference between the instantaneous GAIN value corresponding to the use of a "theoretical" fuel supply system, that is to say such a system that is not dispersed and not aged and whose average characteristic coincides with the value for which no modification of the injection time is applied, and the instantaneous GAIN value applied to the injection time, for a given vehicle (specific to each vehicle produced), c) comparing CRITERION with predetermined minimum and maximum threshold values THRESHOLD_MIN and THRESHOLD_MAX;

d) diagnosing a defective state when CRITERION is outside the window contained between THRESHOLD_MIN and THRESHOLD_MAX.

According to other advantageous and non-exclusive characteristics of this method:

in the step d), the number of time periods during which CRITERION is outside the window contained between THRESHOLD_MIN and THRESHOLD_MAX is counted and said defective state is diagnosed when the number of periods is equal to a predetermined number;

the window variable is assigned to said predetermined number, that the value 1 is subtracted from this variable as soon as a new time period is counted, and that said defective state is diagnosed when the window variable is less than or equal to zero;

said steps a), b), c) and d) are implemented only if at least one of the following preconditions is satisfied:

said richness is being regulated in closed loop mode;

fuel injection is operating in sequential mode;

the load level of the engine (1) and its speed are situated within a predefined region;

the sensors for measuring the variables necessary to the diagnosis are not defective;

said steps a), b), c) and d) are implemented only if all said preconditions are satisfied;

said threshold values depend on the operating conditions of the engine;

said threshold values vary depending on whether the engine is operating hot or cold.

Other features and benefits of the present invention will become apparent from reading the following description of a preferential embodiment. This description will be given with reference to the appended drawings in which.

FIGS. 4A to 4D consist of a set of curves giving, as a function of time, the trend of the main parameters ALPHACL_MOYEN, GAIN, OFFSET and CRITERION used in the context of the present method, in the case of a leak, obstruction, mechanically broken fuel pump type defect;

FIGS. 5A to 5D are curves similar to the preceding curves giving, as a function of time, the trend of the same parameters, in the case of a defect of system ageing type.

Figure 1:
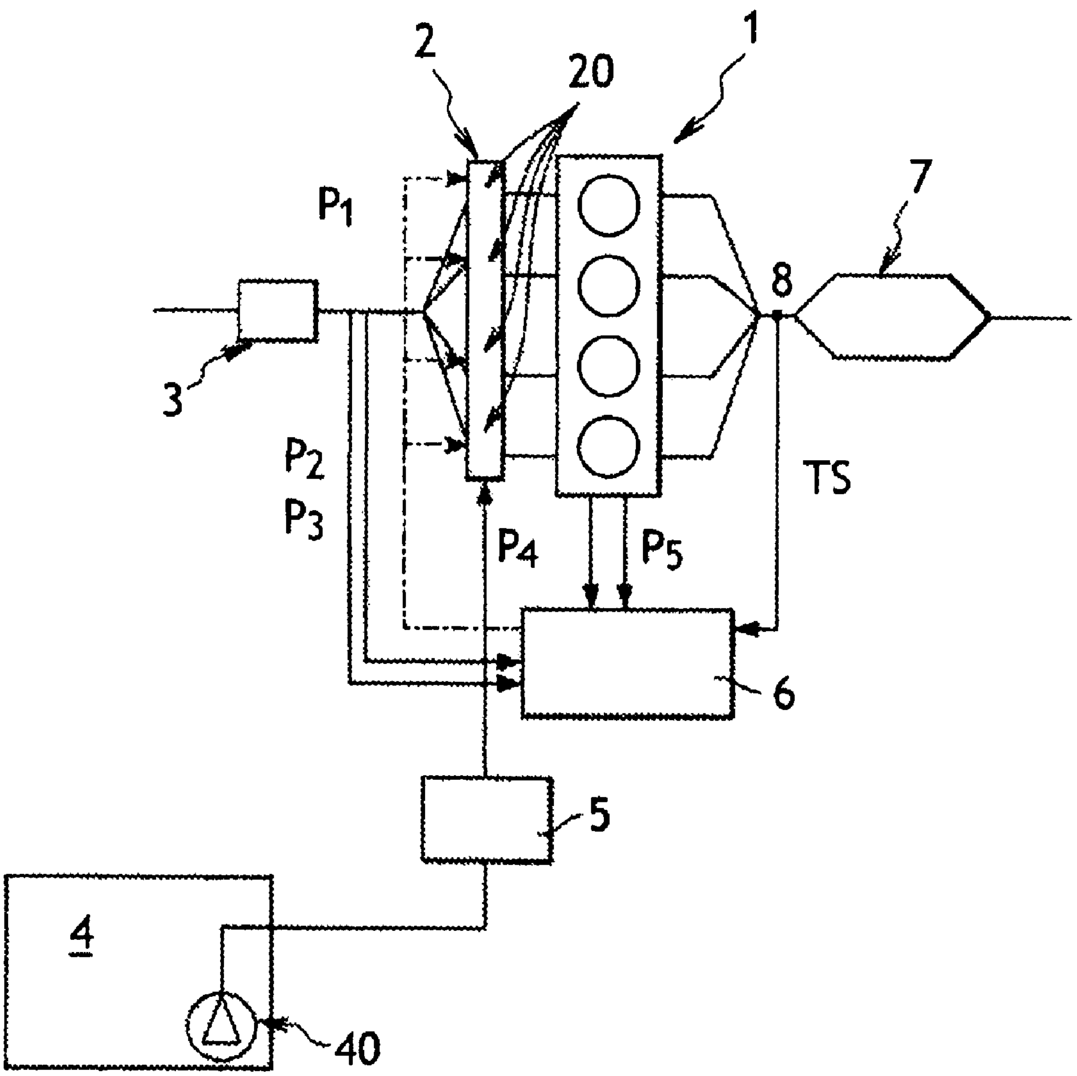
FIG. 1 is a diagrammatic view of an internal combustion engine equipped with a device for implementing the inventive method.

The appended FIG. 1 diagrammatically represents a controlled-ignition, multicylinder internal combustion engine 1, which is equipped with an electrically controlled, multipoint-injection fuel supply rail 2. Thus, each cylinder of the engine is supplied by an electro-injector 20 dedicated to it. An electronic control system 6 controls the open time of each injector so as to adjust the air/fuel mixture admitted into the engine to a given richness value (preferably close to the stoichiometric ratio).

The fuel, stored in a tank 4, is brought to the injectors 20, via a pump 40 and a filter 5.

In parallel, a butterfly valve 3 delivers fresh air.

Downstream of the engine 1, on the exhaust line, there is provided a catalytic converter 8. Just upstream of the latter there is an oxygen probe 8.

The system 6 notably comprises, in a manner known per se, a central unit, memories and various input and output interfaces. This system receives input signals notably relating to the operation of the engine, performs operations and generates output signals, notably intended for the injectors.

The input signals that the system 6 may have to process include the following: the "load" of the engine, the "speed" of the engine, the output signal from the oxygen probe, the "non-failure" of the sensors responsible for managing the diagnosis, and so on.

For this, the engine and/or its immediate environment are provided with:

means P1 of controlling the injectors;

means of measuring or estimating the air temperature in the air distributor at the intake P2;

means of measuring or estimating the pressure in the air distributor at the intake P3;

means of measuring or estimating the water temperature P4;

means of measuring or estimating the speed P5;

means of measuring the output voltage PS of the probe 8.

Figure 2:
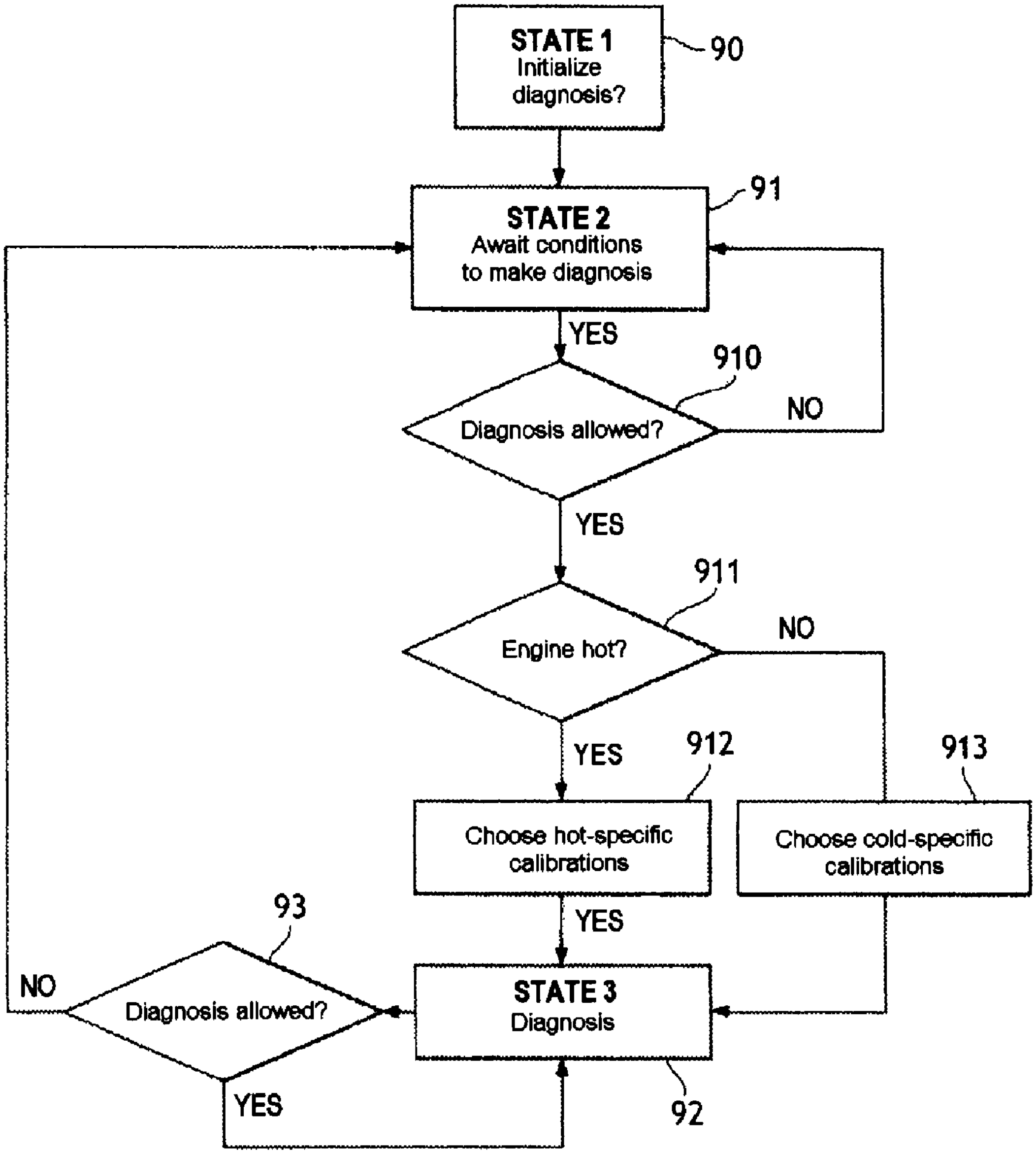
FIGS. 2 and 3 are block diagrams detailing the various steps of the inventive method.
Figure 3:
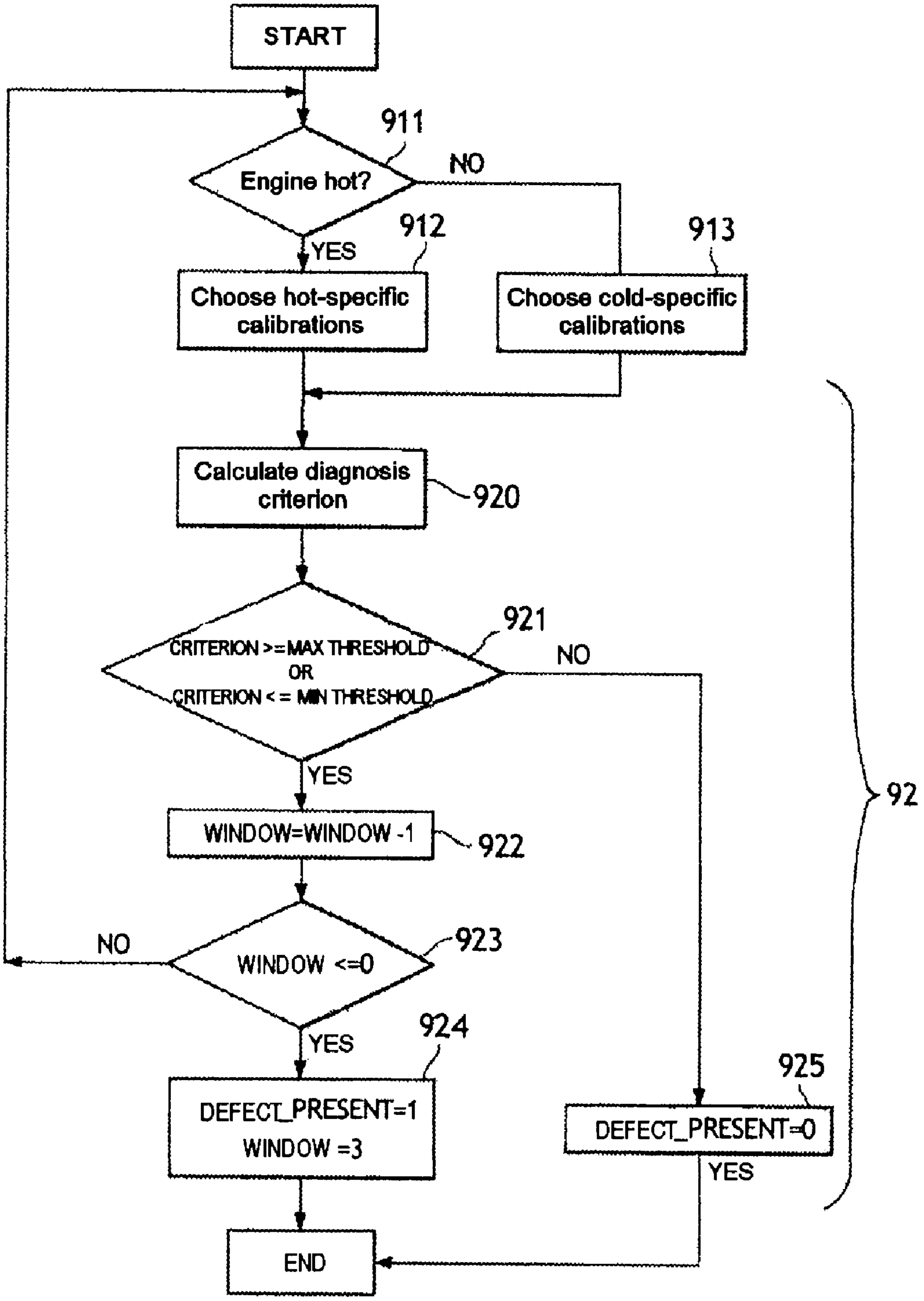

With reference to FIG. 2 and then FIG. 3, there now follows a description of one possible implementation of the inventive method.

This implementation involves three "states". The "STATE 1" (block 90) corresponds to the initialization of all the variables used for the diagnosis. The "STATE 2" (block 91) is a waiting state pending suitable conditions for performing the diagnosis. This corresponds to the first two blocks of FIG. 2.

Finally, the "STATE 3" (block 92) corresponds to the actual diagnosis of the fuel supply circuit.

However, to move from "STATE 2" to "STATE 3", a check is carried out to ensure that the diagnosis activation conditions are met (block 910).

In other words, a check is carried out to ensure that:

richness regulation is in closed loop mode;

injection is operating in sequential mode;

the load level of the engine and its speed are situated within a predefined region;

the sensors used to determine the inputs consumed by the diagnosis are not defective.

The "STATE 3" is retained as long as the diagnosis activation conditions are present.

Before moving to the "STATE 3", a check is carried out to see whether the engine is hot (block 911). If it is (block 912), hot-specific calibrations are configured, whereas, if it is cold (block 913), other cold-specific calibrations are configured. These calibrations are notably the detection thresholds and times.

The effective injection time is calculated as follows:

Effective injection time=B+ALPHACL_MOYEN*GAIN*A*Mair with:

A: a factor taking into account various phenomena associated with canister draining, wetting of the walls, etc., Mair: mass of air admitted into the cylinder measured or estimated, B: OFFSET value, ALPHA_MOYEN: injection time correction factor making it possible to regulate the richness of the exhaust gases leaving the engine.

In practice, to detect a defect on the fuel supply circuit, the diagnosis is based on monitoring the criterion called CRITERION, which is calculated in the "calculate diagnosis criterion" state (block 920). This calculation proceeds as follows: CRITERION is the integral for a time defined by calibrating the sum of the three terms defined hereinbelow:

CRITERION1=difference between the value of ALPHACL_MOYEN for which no correction to the injection time as a function of time is necessary to achieve the richness objective 1 at the exhaust, and the value of ALPHACL_MOYEN applied to the injection time, to achieve the richness objective 1 at the exhaust, CRITERION2=difference between the instantaneous OFFSET value corresponding to the use of a "theoretical" fuel supply system, that is to say one that is not dispersed and not aged and whose average characteristic coincides with the value for which no modification of the injection time is applied, and the instantaneous OFFSET value applied to the injection time, for a given vehicle (specific to each vehicle produced), CRITERION3=difference between the instantaneous GAIN value corresponding to the use of a "theoretical" fuel supply system, that is to say one that is not dispersed and not aged and whose average characteristic coincides with the value for which no modification of the injection time is applied, and the instantaneous GAIN value applied to the injection time, for a given vehicle (specific to each vehicle produced).

When CRITERION is contained within the window delimited by two minimum and maximum thresholds (THRESHOLD_MAX and THRESHOLD_MIN), then a DEFECT_PRESENT counter becomes equal to zero (block 925), notifying that no defect is detected on the fuel supply system.

When CRITERION departs from the region delimited by two minimum and maximum thresholds (THRESHOLD_MAX and THRESHOLD_MIN) (block 921), then a WINDOW variable, to which a predetermined initial value has been assigned, is decremented by 1 (block 922):

if WINDOW>0, the diagnosis recommences:

if WINDOW=0, then DEFECT_PRESENT becomes equal to 1, notifying that a defect is detected on the fuel supply system, then WINDOW is reset (block 924).

There now follows an example of the behavior of the various parameters used by the diagnosis, in nominal or defective operation:

The behavior of the diagnosis criterion is then as follows:

i. there is no defect on the fuel supply circuit, ii. and the hydraulic characteristics of the fuel supply system remain close to those of a so-called nominal system.

In this case, the richness of the exhaust gases leaving the engine upstream of the catalytic converter remains constantly very close to the stoichiometric ratio, and consequently, the correction of the injection time is small (consequence of case i).

Similarly, the two adaptive parameters GAIN and OFFSET keep values very close to the value that they take when the engine is equipped with a fuel supply system whose hydraulic characteristics remain close to those of a so-called nominal system (consequence of case ii).

Figures 4A, 4B, 4C, 4D:
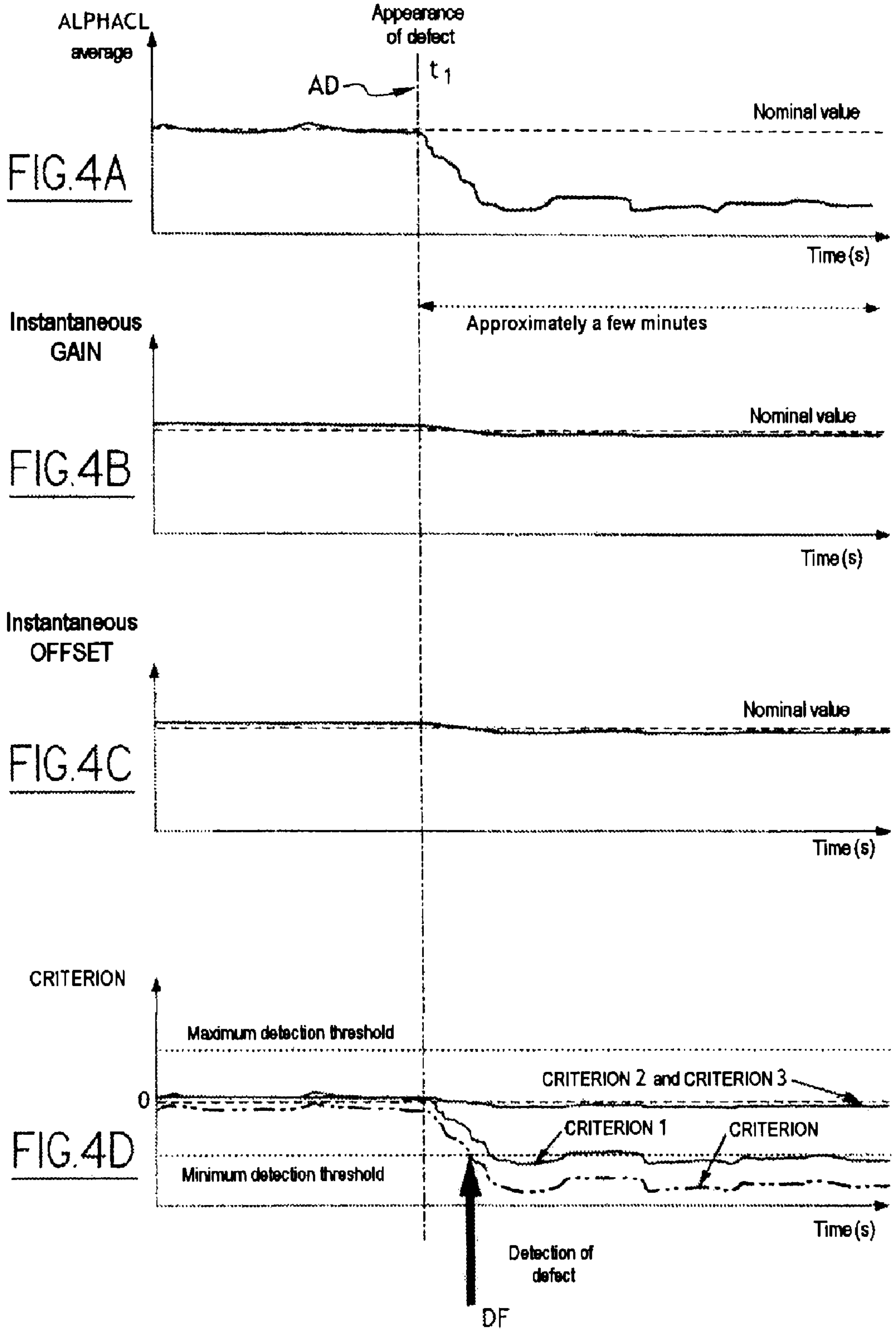

This corresponds to the left hand part of the appended FIGS. 4A to 4C, situated between the time t=0 and t1.

Thus, the value of the criterion described hereinabove will also be low. In practice:

the case i implies a low CRITERION1, the case ii implies a low CRITERION2 and a low CRITERION3, the sum of the three criteria will then also be low.

This can be seen in the corresponding part of FIG. 4D.

In the case of a defect similar to those described in the case i, the richness of the exhaust gases leaving the engine upstream of the catalytic converter is far from the stoichiometric ratio when no correction of the injection time is applied. Once the richness-regulating closed loop is activated, the effect of the defect on the quantity injected is compensated via ALPHACL which increases or which reduces the injection time, so that the richness upstream of the catalytic converter coincides with the stoichiometry. There can then be seen a deviation of the value ALPHACL_MOYEN relative to the nominal value, which is reflected in the appearance of a defect AD at the time t1 in FIG. 4A.

The absolute value of CRITERION becomes high, because that of CRITERION1 is also high.

The presence of a defect on the fuel supply circuit then leads to an absolute increase in the value of the criterion compared to the value that it would take if the engine were equipped with a non-defective fuel supply system.

It then becomes possible to monitor the fuel supply system, by comparing the value of the diagnosis criterion against two thresholds. Once one of these thresholds is exceeded, the system being monitored will be considered to be defective (defect DF detection in FIG. 4D).

In the case of a defect similar to those described in the case ii, at least one of the two adaptive parameters GAIN and OFFSET takes a value far from the value that it would take in the case of the use of a fuel supply system whose hydraulic characteristics remain close to those of a so-called nominal system.

Figure 5A:
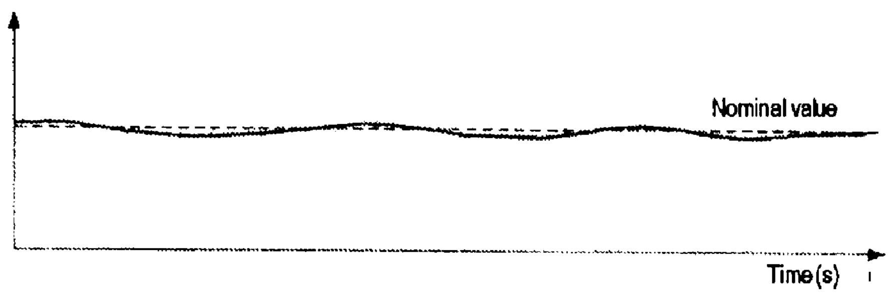
Figure 5B:
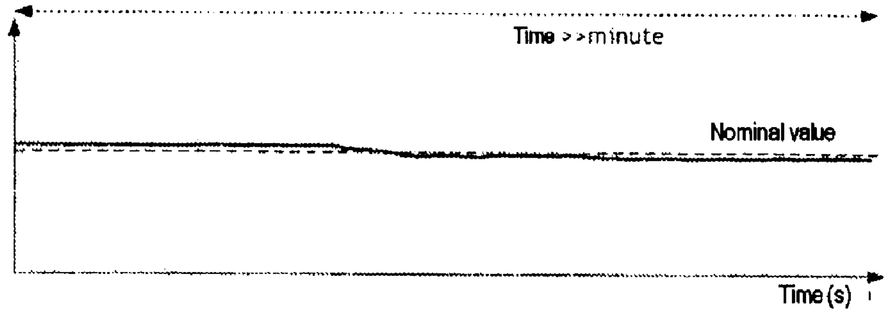
Figure 5C:
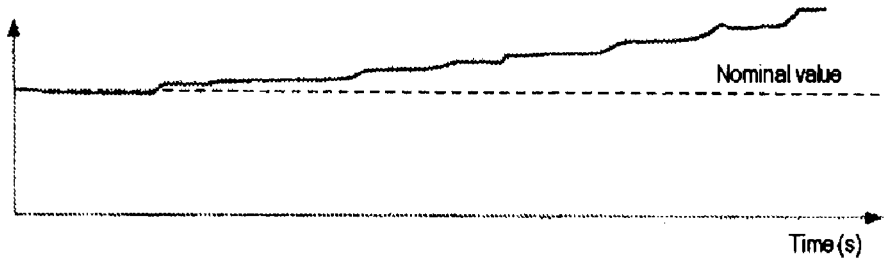

In the case illustrated in FIGS. 5A to 5D, it is the OFFSET parameter that takes a value far from its nominal value (see FIG. 5C).

Consequently, from the appearance of this distant value, the parameter CRITERION will also tend towards high values.

Figure 5D:
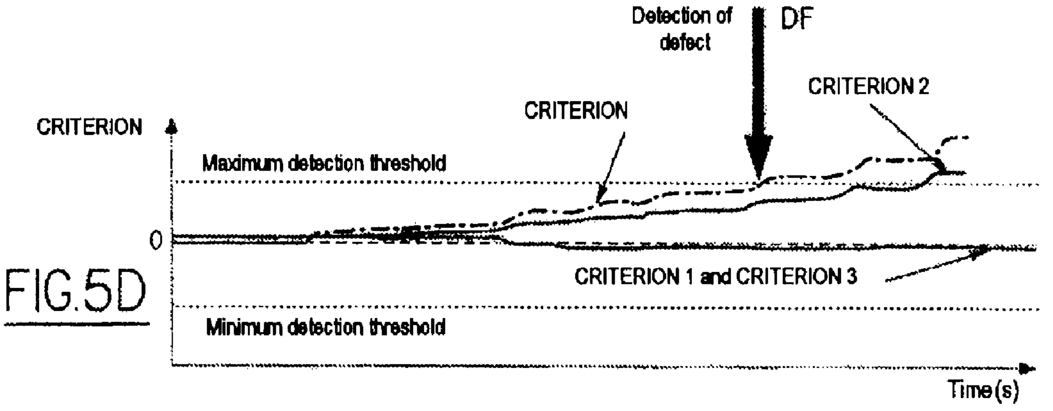

As soon as this value departs from a window formed by maximum and minimum detection threshold values, the defect DF will be detected (see FIG. 5D).

The invention claimed is:

1. A method for diagnosing a state of a system for supplying fuel to a fuel-injected, controlled-ignition internal combustion engine, of a type including an electronic control device which makes use of an oxygen probe for closed-loop regulation of a value of an air-fuel ratio admitted into combustion chambers of the engine, and according to which a signal delivered by the oxygen probe is analyzed, the method comprising:

a) deducing from the signal, a change in effective injection time of exhaust gas leaving the engine, given by relation:

effective injection time=*B*+ALPHACL_MOYEN*GAIN*A*Mair, in which:

B is an OFFSET value;

ALPHACL_MOYEN is an injection time correction factor that makes it possible to regulate richness of the exhaust gases leaving the engine;

GAIN is a coefficient making it possible to take account of drift in hydraulic characteristics of the fuel supply system;

A is a factor that takes into account various phenomena notably linked to canister draining, wetting of walls;

Mair is measured or estimated mass of air admitted into a cylinder of the engine;

b) calculating

CRITERION=*f*(CRITERION1+CRITERION2+CRITERION3)

in which

CRITERION1=difference between a value of ALPHACL_MOYEN for which no correction to the injection time as a function of time is necessary to achieve a richness objective 1 in the exhaust, and a value ALPHACL_MOYEN applied to the injection time, to achieve the richness objective 1 at the exhaust, CRITERION2=difference between an instantaneous OFFSET value corresponding to use of a "theoretical" fuel supply system, which is a system that is not dispersed and not aged and whose average characteristic coincides with a value for which no modification of the injection time is applied, and an instantaneous OFFSET value applied to the injection time, for a given vehicle (specific to each vehicle produced), CRITERION3=difference between the instantaneous GAIN value corresponding to use of a "theoretical" fuel supply system, which is a system that is not dispersed and not aged and whose average characteristic coincides with a value for which no modification of the injection time is applied, and the instantaneous GAIN value applied to the injection time, for a given vehicle (specific to each vehicle produced);

c) comparing CRITERION with predetermined minimum and maximum threshold values THRESHOLD_MIN and THRESHOLD_MAX; and d) diagnosing a defective state when CRITERION is outside a window included between THRESHOLD_MIN and THRESHOLD_MAX.

2. The method as claimed in claim 1, wherein, in the diagnosing d), a number of time periods during which CRITERION is outside the window included between THRESHOLD_MIN and THRESHOLD_MAX is counted and the defective state is diagnosed when a number of periods is equal to a predetermined number.

3. The method as claimed in claim 2, wherein the WINDOW variable is assigned to the predetermined number, the value 1 is subtracted from this WINDOW variable as soon as a new time period is counted, and the defective state is diagnosed when the WINDOW variable is less than or equal to zero.

4. The method as claimed in claim 1, wherein the operations a), b), c), and d) implemented only if at least one of the following preconditions is satisfied:

the richness is being regulated in a closed loop mode;

fuel injection is operating in a sequential mode;

a load level of the engine and its speed are situated within a predefined region;

sensors for measuring variables necessary to the diagnosis are not defective.

5. The method as claimed in claim 4, wherein the operations a), b), c), and d) are implemented only if all the preconditions are satisfied.

6. The method as claimed in claim 1, wherein the threshold values depend on the operating conditions of the engine.

7. The method as claimed in claim 6, wherein the threshold values vary depending on whether the engine is operating hot or cold.

* * * * *